United States Patent
Hamann

[19]

[11] Patent Number: 6,092,036
[45] Date of Patent: Jul. 18, 2000

[54] MULTI-LINGUAL DATA PROCESSING SYSTEM AND SYSTEM AND METHOD FOR TRANSLATING TEXT USED IN COMPUTER SOFTWARE UTILIZING AN EMBEDDED TRANSLATOR

[75] Inventor: Rodney P. Hamann, Tyngsboro, Mass.

[73] Assignee: Davox Corporation, Westford, Mass.

[21] Appl. No.: 09/089,203

[22] Filed: Jun. 2, 1998

[51] Int. Cl.[7] ................................................. G06F 17/28
[52] U.S. Cl. ................................... 704/8; 704/7; 707/536
[58] Field of Search .................................. 704/2, 3, 4, 5, 704/6, 7, 8, 9; 707/531, 536, 1, 2, 3, 4, 5; 709/201, 202, 203; 395/701, 705, 706, 707, 708

[56] References Cited

U.S. PATENT DOCUMENTS

| | | | |
|---|---|---|---|
| 4,566,078 | 1/1986 | Crabtree | 704/8 |
| 4,615,002 | 9/1986 | Innes | 704/8 |
| 5,243,519 | 9/1993 | Andrews et al. | 704/8 |
| 5,307,265 | 4/1994 | Winans | 704/8 |
| 5,392,386 | 2/1995 | Chalas | 345/335 |
| 5,583,761 | 12/1996 | Chou | 707/536 |
| 5,644,775 | 7/1997 | Thompson et al. | 704/7 |
| 5,664,206 | 9/1997 | Murow et al. | 704/8 |
| 5,678,039 | 10/1997 | Hinks et al. | 707/4 |
| 5,751,957 | 5/1998 | Hiroya et al. | 709/203 |
| 5,787,410 | 7/1998 | McMahon | 707/1 |
| 5,974,372 | 10/1999 | Barnes et al. | 704/8 |

OTHER PUBLICATIONS

William S. Hall: "Adapt Your Program for Wordlwide Use with Windows Internationalization Support", Microsoft Systems Journal, pp. 29–45, Dec. 1991.

*Primary Examiner*—Joseph Thomas
*Attorney, Agent, or Firm*—Bourque & Associates, P.A.

[57] ABSTRACT

A multi-lingual data processing system can operate in a source language and one or more target languages by automatically translating text, such as application text and system message text. The multi-lingual data processing system includes computer software that can be developed and deployed in a source language and that obtains translated text from one or more translation tables corresponding to the target languages as the computer software is runs on the system. The translation system includes a translation table builder that creates and/or modifies the translation tables by importing translated text and/or by allowing a user to insert translated text. A translation configuration selector allows the user to select translation configuration setting, such as the selected locality. The translation tables include application text translation tables containing translated application text that is obtained by the application programs as each object is created by the application programs. The translation tables also include system message translation tables for each of the target languages containing translated message text such that messages logged by the system can be displayed with the translated message text from the system message translation table corresponding to the selected locality.

21 Claims, 4 Drawing Sheets

MULTI-LINGUAL DATA PROCESSING SYSTEM AND SYSTEM AND METHOD FOR TRANSLATING TEXT USED IN COMPUTER SOFTWARE UTILIZING AN EMBEDDED TRANSLATOR

FIELD OF THE INVENTION

The present invention relates to a data processing system having a multi-lingual capability and a system and method for translating text embedded in and used by computer software from a source language to a target language, and more particularly, to a multi-lingual data processing system and translation system and method in which a computer program is developed and deployed in a source language and then translated into the target language upon executing the computer program on a computer system.

BACKGROUND OF THE INVENTION

The global nature of the market place today has created an increased market for computer hardware and software that can be used on an international basis. Computer hardware and software vendors are thus required to modify existing products to accommodate a large number of foreign languages. While the demands upon hardware systems are minimal and are often solved by the provision of special keyboard characters, the large textual content of many software applications leads to a more difficult translation problem. The text that is embedded in and used by computer software must be translated to the desired foreign language (commonly referred to as localization).

In a typical data processing system, for example, the text used in the on-screen objects generated or created by the application program, such as window title bar text, menu text, button text and the like, must be translated. Any system messages generated or logged by the computer system during operation of the application program must also be translated. Additionally, the character sets and fonts used to display the text must also be changed to accommodate the target language into which the text is to be translated.

Existing methods of translating or localizing computer programs involve direct revisions of the software code. After the application text has been translated to the target language, the program is then recompiled and linked. The application program is then limited to that particular target language and is sold for use in that target language only. This procedure is inefficient, time consuming, expensive, and subject to errors.

The translation made in the source code of the application program is typically made by a person without sufficient training in programming. This can result in inadvertent changes being made to the syntax of the application program, causing fatal errors when trying to compile, link or run the resulting code with translated text. This process of embedding the translated text within the application program itself also results in the need to separately compile each foreign language version of the application program. The translated application program is then more difficult to evaluate by support personnel who are unfamiliar with the target language of the translated application program. Directly translating the text in the code of the application program also can result in an inconsistent and improper display of the text on the computer screen.

Accordingly, a need exists for a data processing system having multi-lingual capability such that the data processing system can run in one or more pre-defined target languages as well as the source language, thereby allowing localization of the system in a target language while at the same time facilitating service and support by the software vendor in the source language. A need also exists for a multi-lingual data processing system having software that can be developed and deployed in a source language and then translated in real time to any one of the predefined target languages as the software creates objects to be displayed. A need also exists for a system and method of translating software application text in a more efficient manner without having to directly modify the software source code and by importing any existing translation information and preventing unnecessary redundant translation.

SUMMARY OF THE INVENTION

The present invention features a multi-lingual data processing system including software, for processing data. The multi-lingual data processing also includes a locality setting identifying a target language into which text associated with the software is to be translated, and at least one text translation table corresponding to the target language identified by the locality setting and including target language text for use with the computer software on the data processing system. The computer software obtains the target language text from the text translation table corresponding to the target language identified by the locality setting. The multi-lingual data processing system preferably includes a translation configuration selector including a configuration tool, responsive to a user input, for selecting one or more translation configuration settings.

In one embodiment, the computer software includes at least one application program that generates a plurality of displayed objects having text. The text translation table includes at least one application text translation table including source language text items and target language text items for each of the displayed objects having text.

The application program preferably includes a translator embedded in the application program and responsive to the generation of each of the displayed objects, for finding the source language text items in the application text translation table and for replacing the text associated with each of the displayed objects having text with the target language text items from the application text translation table before the objects are displayed. It also must adjust the character set. For example, in one embodiment utilizing the Powerbuilder program, the character sets are stored in a master table. Objects in a window displayed on a computer screen are displayed differently based upon the selected character set. For example, bolding can be turned on or off for certain character sets, etc.

In another embodiment, the text translation table includes at least one system message text translation table for the target language identified by the locality setting. Each system message text translation table includes a system message identifier and system message text in the target language identified by the locality setting. The data processing system further includes a message log history table, for logging at least one message identifier and at least one parameter corresponding to at least one event occurring in the data processing system, and a system message finder, for retrieving each message identifier and parameter in the message log history table and for finding a corresponding message identifier and message text in the system message text translation table. The message parameter is combined with the message text in the target language from the system message text translation table for display.

The multi-lingual data processing system preferably includes a translation table builder, responsive to a user input, for building each text translation table. The translation table builder preferably includes a text editor, for allowing a user to translate source language text items into target language text items.

The system can also include a translation master table, responsive to the computer software. The translation master table includes a locality identifier and translation data for at least the target language identified by the locality setting. One example of the translation data includes character and font data for the target language identified by the locality setting.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
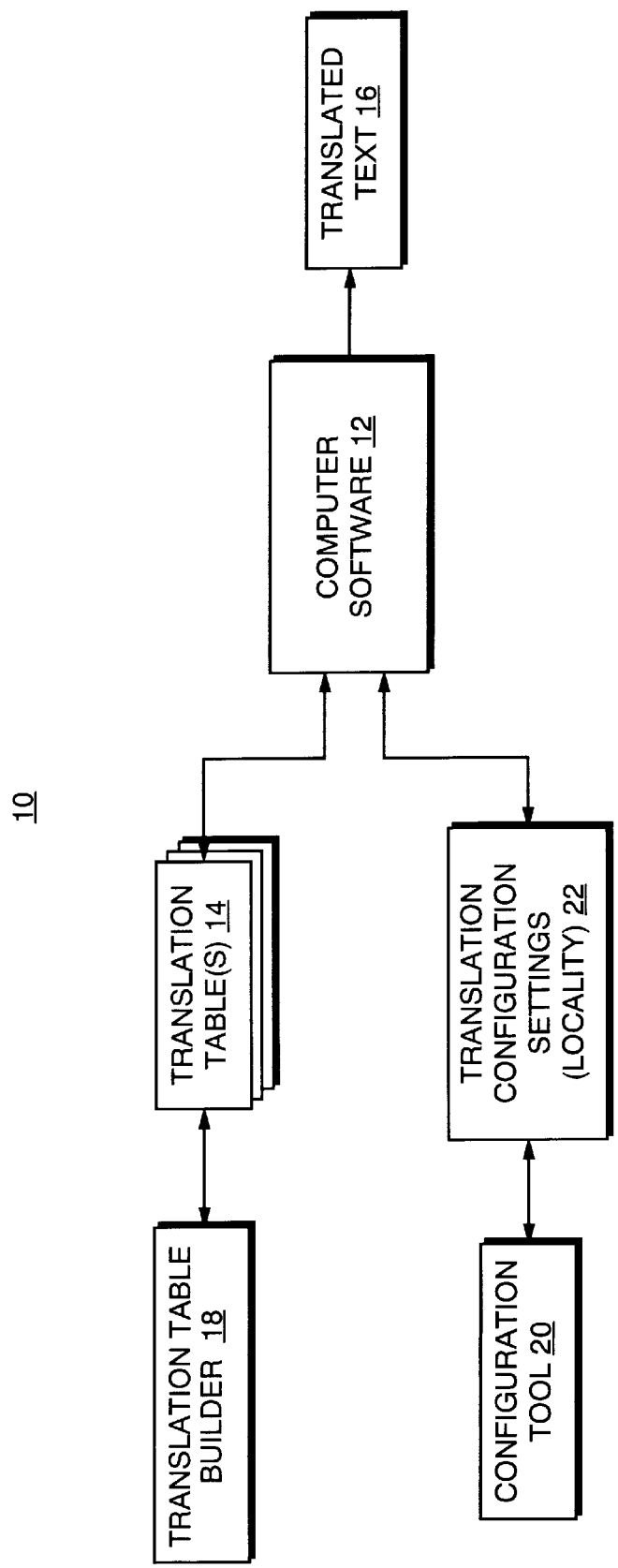
FIG. 1 is schematic block diagram of a multi-lingual data processing system, according to the present invention.

A multi-lingual data processing system 10, FIG. 1, according to the present invention, can operate in one or more languages depending upon the locality in which the data processing system 10 is used. The data processing system 10 includes computer programs or software 12 that can be developed and deployed in a source language, such as English, and then translated into any number of target languages for use in any number of different localities.

As the computer software 12 runs or before it begins to run on the data processing system 10, the computer software 12 references one or more translation tables 14 containing target language text in one or more target languages and other translation data. Any text generated by the computer software 12, such as application text and system message text, is then displayed as translated text 16 in a target language.

A translation builder 18 is used to establish or build the one or more translation tables 14 that contain the translated or target language text corresponding to the source language text generated by the computer software 12. The computer software 12 can be translated to any target language having a translation table 14 created by the translation table builder 18. A translation configuration selector 20 which is part of a system configuration tool, allows a user to select or set one or more translation configuration settings 22, such as a locality setting that identifies the desired target language. The computer software 12, in response to the translation configuration settings 22, refers to the appropriate entry in the translation table 14, replaces the source language text generated by the software 12 with text in the target language selected by the user, and displays the translated text 16.

In one example, the multi-lingual data processing system 10 is a telephone call center management system, such as the type sold under the name UNISON® by Davox Corporation of Westford, Mass. Although this is not a limitation of the present invention. This type of system is discussed in greater detail in U.S. Pat. No. 5,592,543 issued Jan. 7, 1997, assigned to the assignee of the present application and incorporated herein by reference. The present invention also contemplates using the system and method of the present invention with any type of data processing system to provide multi-lingual capability.

Figure 2:
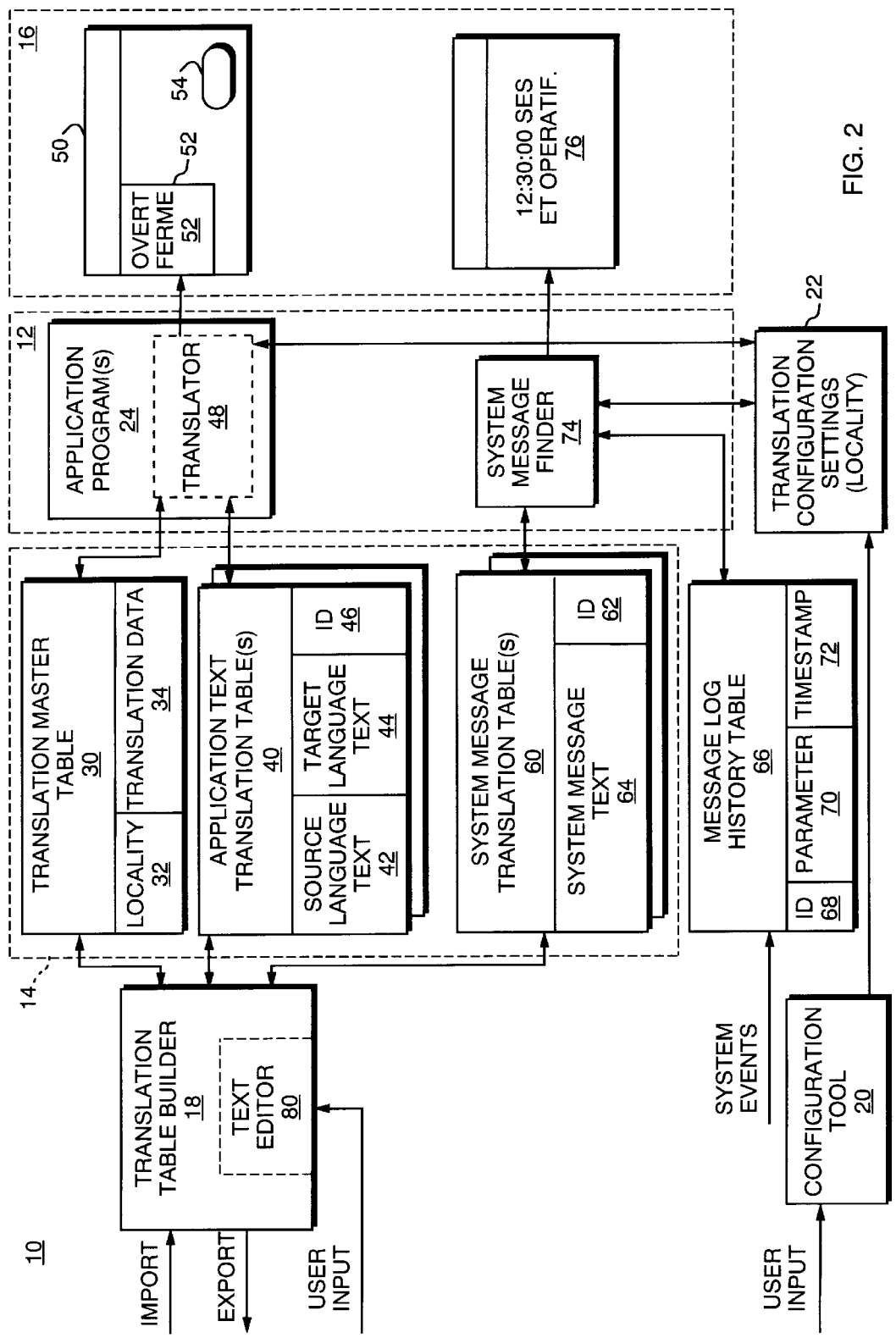
FIG. 2 is a schematic block diagram of a multi-lingual data processing system including a system for translating application text and system message text, according to an exemplary embodiment of the present invention.

In the preferred embodiment, the multi-lingual data processing system 10, FIG. 2, according to the present invention, translates the application text embedded in one or more application programs 24. The translation tables 14 preferably include a translation master table 30 having a locality identifier 32 for each locality or target language into which the application program 30 can be translated as well as translation data 34, such as the character set and the font to be used, for that target language. The translation master table 30 can also include a translate tool bar text setting that indicates whether or not toolbar text is to be translated and a translate tool bar balloon setting that indicates whether or not balloon help text is to be translated. Because the font used for this text is so small, a translation for these and other similar items may or may not not be desirable.

The translation table 14 also include an application text translation table 40 for each target language to be used on the system. Each application text translation table 40 includes source language application text items 42 used within the application program 24 and the corresponding target language application text items 44 as well as an application text identifier 46 that identifies each text item.

The application program(s) 24 preferably includes a translator 48, such as a translation algorithm embedded within each application program 24, for obtaining the translation data 34 from the translation master table 30 and the target language text items 44 from the appropriate application text translation table 40. The translator 48 causes the application program 24 to use the target language application text items 44 in the target language indicated by the translation configuration settings 22, as the application program 24 creates or constructs objects, such as windows 50, menus 52, buttons 54 and other objects having associated text, to form a graphical user interface (GUI).

The application program 24 is preferably developed using an application development tool, such as the type sold under the name PowerBuilder® by Powersoft. This type of application development environment is object oriented and event driven such that each object 50, 52, 54 has properties and events associated with that object.

In one example, the translator 48 is responsive to constructor events that occur as one or more of the objects 50, 52, 54 are constructed by the application program 24, for replacing the source language text item associated with that object with the corresponding target language text item 44 from the appropriate application text translation table 40. Where an object oriented application development environment, such as PowerBuilder®, is used, the objects 50, 52, 54 and the translator 48 create a framework that can be used with other applications. Thus, other application programs to be developed for a multi-lingual data processing system can inherit the translation algorithms. Other objects created by the application program 24 that include associated text to be translated include, but are not limited to, check boxes, drop down list boxes, drop down picture list boxes, edit masks, group boxes, list boxes, picture list boxes, radio buttons, single line edits, static text, and tree views.

In the exemplary embodiment, the application program(s) 24 include a call campaign manager application, a call table operations application, an agent statistic application, and other applications commonly used in the telephone call center management system sold by the assignee of the present invention under the trademark UNISON®. These applications are typically loaded and run on a workstation, such as a UNIX based Sparc workstation available from Sun Microsystems, or a PC having a windows operating system, such as Windows 95® available from Microsoft.

When the multi-lingual data processing system 10 is used with a PC supporting the Microsoft Windows 95® operating system, the translation configuration settings 22 can be defined in the Windows 95 registry. The translation system and method used in the present invention, however, can be used with any type of software and any type of computer system in a telephone call center or any other type of data processing system. The translation table builder 18 and the translation configuration selector 20 are preferably implemented on the system as software utility programs.

The multi-lingual data processing system 10 of the present invention can also translate system messages that are logged by the data processing system 10 during processing. The translation tables 14 preferably include one or more system message translation tables 60 corresponding to the source language and the one or more target languages. Each of the system message tables 60 includes at least a message identifier 62, for identifying the message and matching the message with an event logged by the system, and message text 64 for the messages available on the system in the language corresponding to that table. The system message translation table 60 can also include a message sequence indictor that indicates whether the message has more than one line.

The data processing system 10 includes a message log history table 66 that logs system events that occur in the data processing system 10 and includes a plurality of entries or rows corresponding to each system event logged by the data processing system. In the exemplary embodiment, the events include the start up of the various servers or other components in a telephone call center, the log in and log out of agents in a telephone call center, and other events that occur in a telephone call center. Each entry in the message log history table 66 includes a message identifier 68 corresponding to the type of system event that has occurred, one or more parameters 70 further defining the particular system event being logged, a time stamp 72, and other system message data. The parameters 70 include text that is preferably not specific to the source language and does not require translation, such as server names (e.g. SES), numbers, and the like. The message text 64 in the system message translation table(s) 60 includes a parameter variable that indicates where the parameters 70 logged in the message log history table 66 are to be inserted into the message text 64. In the exemplary embodiment, additional data logged in the log history table 66 can include row number, class, program, and severity.

A system message finder 74 locates the logged messages in the message log history table 70 and the message text 64 in the system message translation table 60 for the target language indicated by the translation configuration settings 22. If no locality has been selected, the message text 64 is used from the message translation table 60 for the source language. The logged message data in the message log history table 64 is combined with the translated message text 64 in the selected target language from the system message translation table 60. The system messages can then be displayed, for example in a message window 76, to the system operator in the selected target language.

In the preferred embodiment, the translation tables 14 are stored in a database in the data processing system 10, and a system configuration tool 20 (a program titled davoxcfg in the present embodiment) is used to automate the set up of the database connectivity, Windows 95 registry settings, including database and port settings, sets the database management system (DBMS) settings that identifies the type of database, such as SYBASE (SYC), as well as other database parameters, such as database connection strings. The database settings are preferably configured first to provide the database connectivity required for the remaining configuration and translation processes.

The system configuration tool 20 is also used to configure the ports, IP addresses and host names in the data processing system 10.

To establish or build the translation tables 14, e.g., the translation master table 30, the application text translation tables 40, and the system message translation tables 60, the translation table builder 18 can import the translation data, for example, from previously defined translation tables 14. The translation table builder 18 further includes a text editor 80 that allows a user to create new translation tables 14 or modify existing translation tables 14 that have been imported or previously created by a user. The translation table builder 18 can also export the translation tables 14 for use in another multi-lingual data processing system or for use as a backup in the present system.

According to the preferred method of creating application text translation tables 40 and system message translation tables 60, the translation table builder 18 will first ask the user to select a locality (country/location of use of the computer program) for translation and editing purposes. The locality can be a previously defined locality or a new locality to be defined by the user. The localities that are available for editing are listed in the translation master table 30 and are displayed, for example, in a dialog box for selection by the user to view or edit the translation data pertaining to that locality.

When the user selects the option of creating a new locality, a dialog box is displayed that requests a locality identifier 32, such as the name of the country and a code for the country, and a new entry or row is added to the translation master table 30 for that newly defined locality. The user can then select that new locality for editing and provide the translation data 34 for that locality. Once a locality has been defined and selected for editing, the translation table builder 18 can be used to import and/or edit translated text in the application text translation table(s) 40 or system message text translation table(s) 60.

In one example, the application text translation tables 40 are created and/or modified with the translation table builder 18 as the application program 24 to be translated is loaded. As each application text item is displayed by the application program 24, the user enters the corresponding translation for that application text item in the window of the text editor 80. The text editor 80 preferably requests the insertion of two lines of text, one line of application text in the source language and a second line of application text translated into the target language. The application text identifier 62 is also preferably assigned to each entry of text as the application program 24 generates application text items. The translation table builder 18 places the source language text items 42, target language text items 44, and text item identifiers 46 into the application text translation table 40.

If an application text translation table 40 has been imported for the application program 24, the source language application text 42 and target language application text 44 should appear in the text editor 80 as the application program 24 is loaded. The user can then modify and/or add to the target language text using the text editor 80 if necessary. Once the translations are completed for an application program 24, the application program 24 is closed and reloaded, and the target language application text 44 is displayed in place of the source language application text 42, provided the translation configuration settings 22 are set to a locality for that particular target language.

According to one alternative, the source language application text items 42 can be automatically inserted into the application text translation table 40. In one example, this would be performed by selecting an automatic insert setting in the translation configuration settings 22, causing the translator 48 in the application program 24 to automatically insert the source language application text into the application text translation table 40 as the application program 24 is loaded. The text editor 80 of the translation table builder 18 can then be used to add the target language text 44 corresponding to the source language application text that has been automatically inserted. The user thus is not required to manually enter the source language application text embedded in the original application program 24.

When creating system message translation tables 60, the text editor 80 displays a window having a first line for the message text in the source language and a second line for the translated message text in the target language. The data processing system 10 preferably includes a system message translation table 60 having message text in the source language, and the text editor 80 initially displays the source language system message text. The user can translate and insert the target language message text that corresponds with the source language message text, and the translation table builder 18 places the target language message text 64 in the system message translation table 60 for that target language. The system message translation tables 60 can then be exported and saved for importing to another system or for use as a backup in the present system.

If the translation tables 14 are created for the desired target language and that target language (or locality) is selected using the translation configuration selector 20, the multi-lingual data processing system 10 will display text in that desired target language when the system operates. The translation configuration selector 20 displays a list of currently defined localities (or target languages) and the user selects the desired locality or target language from the list. If the desired locality (or target language) is not present in the list, a new locality can be added but the translation tables 14 for that locality must be developed using the translation table builder 18.

Figure 3:
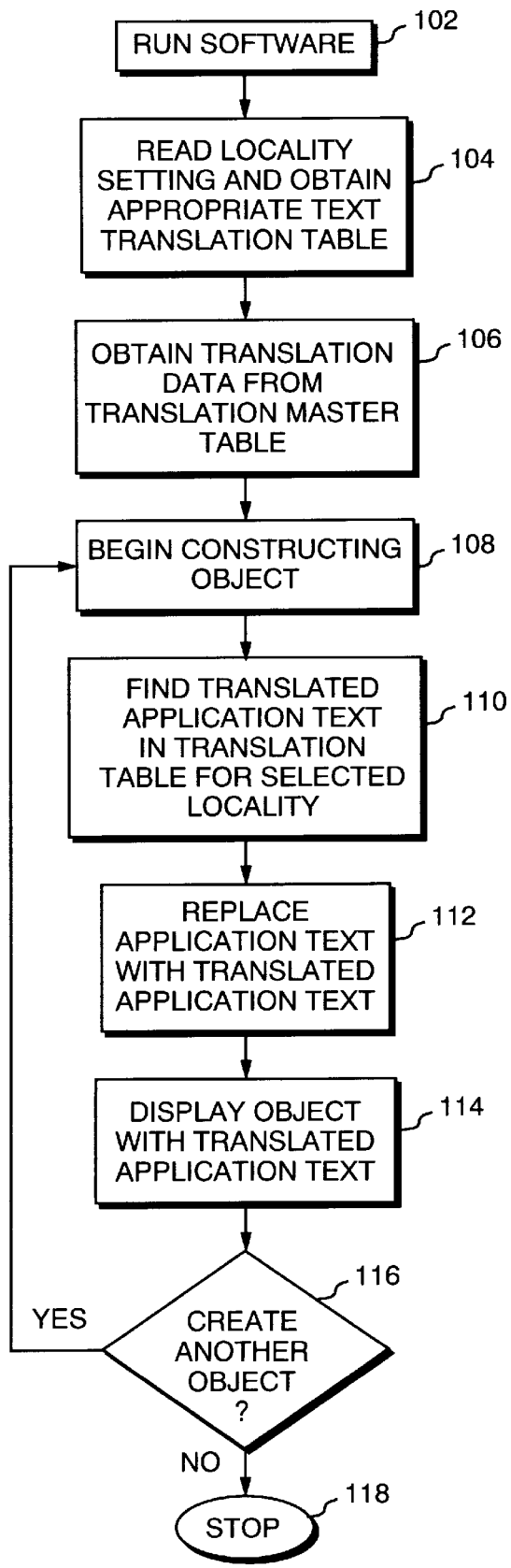
FIG. 3 is flow chart illustrating a method of translating application text in an application program, according to one embodiment of the present invention.

The translation of the application program 24, FIG. 3, begins by running the application program 24, step 102. When the translator 48 is started with the application program 24, the translator 48 reads the translation configuration settings 22 for the selected locality and then queries the database for the application text translation table 40 corresponding to the target language of the selected locality, step 104. The translator 48 also queries the translation master table 30 to obtain character set, font and other translation data for that selected locality, step 106. For example, if the locality setting 22 is set to France, the translator 48 will find the locality identifier 32 for France in the translation master table 30 and will find the application text translation table 40 having application text in French.

Once the translator 48 has obtained the character set and font setting from the translation master table 30 and has obtained the application text translation table 40 for the selected locality, the application program begins creating each of the objects 50, 52, 54 that make up the user interface of the application program, step 108. As each object is created, the translator 48 finds the source language application text 42 associated with that object in the appropriate application text translation table 40 and retrieves the corresponding translated target language text 44 from the application text translation table 40, step 110.

For some objects, the retrieval of target language text 44 is triggered when a constructor event (the event which causes the "creation" of the "window" associated with the object, since tis all occurs on a windows based system) occurs as the object is created by the application program 24. In response to the constructor event, the translator 48 takes the string of text associated with that object, beginning with the window title and proceeding to the window text, and returns the translated string of text obtained from the target language application text 44 in the application text translation table 40 before the original text is displayed. If an object does not have a constructor event, the translator 48 can initiate translation of the text associated with those objects and can then pass the translated text to the object. The translator 48 identifies objects that do not have constructor events and performs the translation of those objects.

The source language application text associated with the object being created is replaced with target language application text 44, step 112. In the above example, the source language (or English) application text items associated with the objects, such as menu text items "Open" and "Close", are replaced with the corresponding target or locality language application text items, such as "Overt" and "Ferme" (in the case of French as the locality). Each of the objects 50, 52, 54 created by the application program are then displayed with the translated text in the selected target language, step 114. If remaining objects are to be created, step 116, the process is preferably repeated for each of the objects having associated application text to be translated until all of the objects have been created by the application program 24 and displayed with translated application text, step 118. Accordingly, the application programs 24 in the multi-lingual data processing system of the present invention are essentially self-translating into the selected target language as the application programs 24 run on the system.

Figure 4:
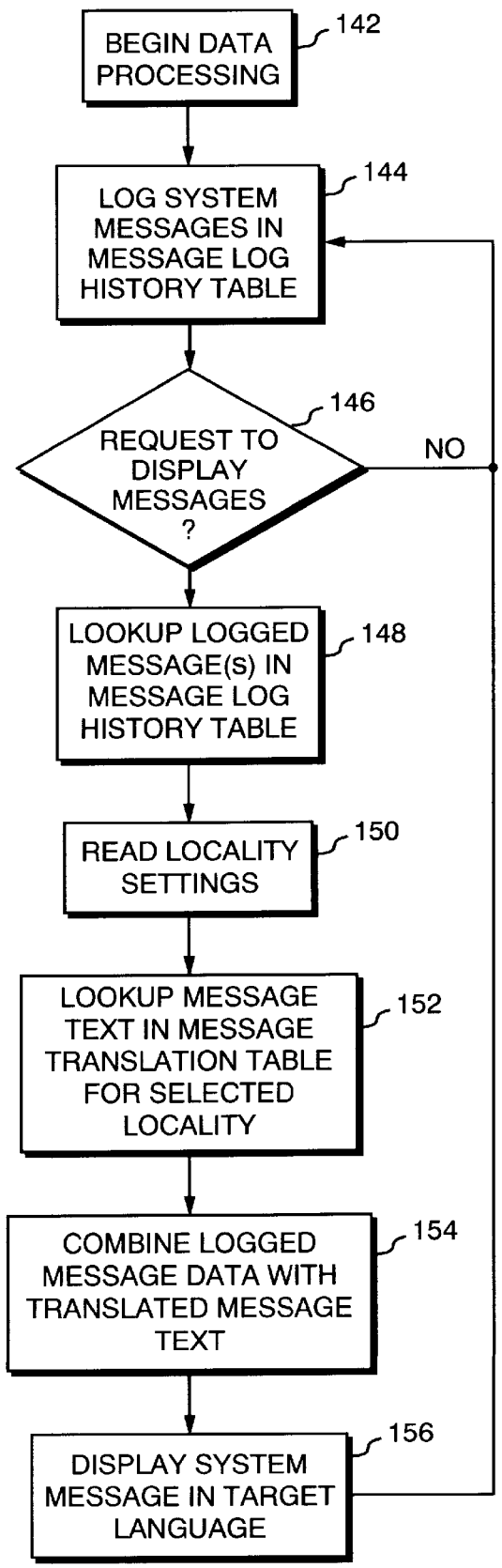
FIG. 4 is a flow chart illustrating a method of translating system message text, according to one embodiment of the present invention.

The translation of the system messages occurs when data processing begins, step 142, FIG. 4. As the system processes data and events occur in the system, the system messages are logged in the message log history table 66, step 144, for example, by inserting the message identifier 68 corresponding to the event, the parameter(s) 70, the time stamp 72, and any other event data. In one example, one type of event that is logged is the starting of a server or other component in the data processing system, and each of the system message translation tables 60 includes message text 64 and a message identifier 62 for this event. For example, the source language (or English) message translation table can include the message "%1 UP AND RUNNING." and the target language (such as French) message translation table can include the message "%1 ET OPERATIF." where %1 is a parameter variable. When the event occurs, the message identifier 68 for that message is logged in the message log history table 66 together with a parameter 70 that identifies the server or component (e.g., SES (System Event Server)) and a time stamp 72.

When the user of the data processing system wants to display the system messages, for example, in message window 76, the system message finder 74 queries the message log history table 66 for the stored messages including the message identifier 68 and the associated parameters 70, step 148. The system message finder 74 then queries the system message translation table 60 for the selected locality, step 150, and finds the message text 64 having a matching message identifier 62 to that of the message logged in the message log history table 66, step 152. The logged message data, such as the message parameter(s) 70 and time stamp 72, is then combined with the translated message text 64, step 154, and the resulting system messages are displayed in the message window 76 in the target language, step 156. In the above example where the target language is French, the parameter "SES" replaces the parameter variable %1, and the message is displayed in the message window 76 as "12:30:00 SES ET OPERATIF."

Accordingly, the multi-lingual data processing system of the present invention can operate in a number of predefined target languages without requiring revisions of the software code to translate the embedded application text. The translation system and method is more efficient than existing methods by importing existing translation information and by facilitating user input of translated text. The translation system and method of the present invention also features application programs that can be developed and deployed in a source language and can run in either the source language or can self-translate into a selected predefined target language.

Modifications and substitutions by one of ordinary skill in the art are considered to be within the scope of the present invention which is not to be limited except by the claims which follow.

What is claimed is:

1. A multi-lingual data processing system, said data processing system comprising:
    computer software for processing data in said data processing system, said computer software including at least one application program that generates a plurality of displayed objects having text to be displayed, said application program including an embedded translator;
    a locality setting identifying a target language into which text associated with said computer software is to be translated; and
    at least one text translation table corresponding to said target language identified by said locality setting and including source language text items and target language text items for each of said plurality of displayed objects having text, wherein said translator embedded in said application program is responsive to the generation of each of said plurality of displayed objects having text to be displayed, for finding said source language text items corresponding to said text to be displayed in said text translation table, and for replacing said text to be displayed associated with each of said plurality of displayed objects having text to be displayed with said target language text items from said text translation table.

2. The system of claim 1 wherein said at least one text translation table includes at least one system message text translation table for said target language identified by said locality setting, each said system message text translation table including a system message identifier and system message text in said target language identified by said locality setting.

3. The system of claim 2 further including:
    a message log history table, for logging at least one message identifier and at least one parameter corresponding to at least one event occurring on said data processing system; and
    a system message finder, for retrieving each said message identifier and parameter in said message log history table, and for finding a corresponding said message identifier and message text in said system message text translation table, wherein said message parameter is combined with said message text in said target language from said system message text translation table for display.

4. The system of claim 1 further including a translation configuration selector, responsive to a user input, for selecting said at least one translation configuration setting.

5. The system of claim 1 further including a translation table builder, responsive to a user input, for building said at least one text translation table.

6. The system of claim 5 where in s aid translation table builder includes a text editor, for allowing a user to translate source language text items into target language text items.

7. The system of claim 1 further including a translation master table, responsive to said computer software, said translation master table including a locality identifier and translation data for at least said target language identified by said locality setting.

8. The system of claim 7 wherein said translation data in said translation master table includes character and font data for said target language identified by said locality setting.

9. A system for translating text in an application program on a computer system from a source language to at least one target language, wherein said application program generates a plurality of displayed objects having text in said source language, said system comprising:
    a translation configuration selector, responsive to at least one translation configuration setting including a locality identifier identifying said target language, for selecting said locality identifier identifying said target language;
    at least one application text translation table, for storing source language application text used in each of said plurality of displayed objects generated by said application program and for storing corresponding target language application text in said target language;
    a translation table builder, for establishing said at least one application text translation table including said source language text and said target language text; and
    a translator embedded in said application program, responsive to said locality identifier and said generation of each of said plurality of displayed objects by said application program, for finding said source language text for each of said plurality of displayed objects in said translation table, and for replacing said source language text of each of said plurality of displayed objects with said corresponding target language text from said application text translation table as each of said plurality of displayed objects is generated.

10. The system of claim 9 wherein said translation table builder establishes said at least one translation table by importing said at least one translation table.

11. The system of claim 9 wherein said translation table builder includes a text editor, for establishing said at least one translation table by user input of at least some of said source language text and said target language text.

12. The system of claim 11 wherein said translation configuration settings include an automatic insert setting, and wherein said translator embedded in said application program, in response to said automatic insert setting, automatically inserts said source language text into said application text translation table when said application program is loaded, for establishing said application text translation table.

13. The system of claim 9 further including a translation master table having a record corresponding to each said at least one target language, said record including a target language identifier identifying at least said target language, a character set corresponding to said target language, and a font, wherein said translation table builder creates and modifies each said at least one record in said translation master table.

14. The system of claim 9 further including:

a system message translation table corresponding to each said at least one target language, wherein each entry in said system message translation table includes a message identifier and target language text of a message corresponding to said message identifier, wherein said target language text of said plurality of messages in said target language is established using said translation table builder;

a message log history table, responsive to at least one event generated in said computer system, for logging message identifiers and message parameters for each message corresponding to said at least one event; and a message finder, for locating at least one message identifier in said message log history table, for retrieving target language text corresponding to said at least one message identifier from said system message translation table, and for combining said message parameter with said target language text of said message for display to a user.

15. A method of translating at least one application program on a computer system from a source language into at least one target language, said method comprising:

selecting a locality setting for said target language;

building at least one translation table including original text of said at least one application program in said source language and corresponding translated text in said target language;

loading said at least one application program including a translator embedded in said application program;

finding said original text in said translation table as each displayed object of said application program loads; and exchanging said original text in each displayed object of said application program with said corresponding translated text in said translation table while said application program is running using said translator embedded in said application program.

16. The method of claim 15 wherein the step of building said at least one translation table includes importing said at least one translation table.

17. The method of claim 15 wherein the step of building said at least one translation table includes entering at least some of said original text and said translated text using an editing window.

18. The method of claim 15 wherein the step of building said at least one translation table includes:

loading said application program; and automatically inserting said original text into said translation table as each displayed object of said application program is loaded.

19. The method of claim 15 further including the steps of:

creating a master translation table, wherein said translation master table includes at least one record corresponding to said at least one target language, said at least one record including a language identifier identifying said at least one language, a character set identifier identifying a character set to be used with said at least one language, and a font identifier identifying a font to be used with said at least one language, and wherein said translator embedded in said application program responds to said translation master table to determine said character set and said font.

20. The method of claim 15 further including building at least one system message table including translated text for a plurality of system messages in said target language.

21. The method of claim 20 further including:

logging system messages in a log history table including a message identifier and at least one message parameter;

finding said translated text in said system message table corresponding to said message identifier of a message logged in said log history table; and combining said translated text from said system message table with said message parameter from said log history table; and displaying said message in said translated text.

* * * * *